(12) United States Patent
Oki et al.

(10) Patent No.: US 6,394,467 B1
(45) Date of Patent: May 28, 2002

(54) RETRACT TYPE CHUCK

(75) Inventors: Masaru Oki; Muneki Hiraoka, both of Yao (JP)

(73) Assignee: Teikoku Chuck Co., Ltd., Osaka (JP)

( * ) Notice: Subject to any disclaimer, the term of this patent is extended or adjusted under 35 U.S.C. 154(b) by 21 days.

(21) Appl. No.: 09/588,199

(22) Filed: Jun. 6, 2000

(30) Foreign Application Priority Data

Jun. 8, 1999 (JP) ............................................ 11-160694

(51) Int. Cl.⁷ .................................................. B23B 31/163
(52) U.S. Cl. ...................................... 279/106; 279/141
(58) Field of Search .............................. 279/35, 37, 65, 279/106, 114, 141

(56) References Cited

U.S. PATENT DOCUMENTS

| | | | | |
|---|---|---|---|---|
| 1,412,170 A | * | 4/1922 | Dixon | 279/141 |
| 1,812,006 A | * | 6/1931 | Jellicoe | 279/106 |
| 1,881,905 A | * | 10/1932 | Page et al. | 279/106 |
| 2,893,744 A | * | 7/1959 | Anthony | 279/141 |
| 3,420,538 A | * | 1/1969 | Benjamin et al. | 379/141 |
| 5,464,233 A | * | 11/1995 | Hanai | 279/137 |

FOREIGN PATENT DOCUMENTS

JP        403256604 A    * 11/1991    .................. 279/106

* cited by examiner

Primary Examiner—Daniel W. Howell
(74) Attorney, Agent, or Firm—Wenderoth, Lind & Ponack, L.L.P.

(57) ABSTRACT

A retractable chuck has a housing adapted to be fastened to a spindle of a lathe, a plurality of shafts mounted in the housing and having proximate ends near the lathe adapted to be coupled to a drawbar of the lathe, and jaws each fastened to one of the shafts. The shafts are formed with a guide groove and guide pins fixed to the housing are received in one of the guide grooves. Each of the grooves has a first portion extending parallel to the central axis of the respective shaft, and a second portion extending obliquely with respect to the central axis of the shaft from one end of the first portion near the lathe toward the proximate end of the chuck. This makes it possible to clamp a stepped workpiece.

3 Claims, 5 Drawing Sheets

RETRACT TYPE CHUCK

BACKGROUND OF THE INVENTION

The invention relates to a retractable or draw type chuck.

There are generally two types of retractable chucks. The first type clamps the side face of a workpiece and thus applies gripping force radially inwardly of the workpiece. The second type clamps an end face of a workpiece and thus applies gripping force in the axial direction of the workpiece. This invention relates to the first type. Atypical conventional chuck of this type is shown in FIG. 4. Some numbered elements in FIG. 4 are not described here but like elements will be described later with reference to the figures showing the embodiment.

The chuck of FIG. 4 includes a housing 3 and three round shafts 5 mounted in the housing and having their proximate ends coupled to a common drawbar (not shown) of the lathe and each carrying a jaw 6 at its distal end remote from the lathe. The shafts 5 are arranged so as to be moved along three equiangularly (120°) spaced general lines of an imaginary cone coaxial with the drawbar and tapering toward the proximate end of the chuck. Each shaft 5 is formed with a guide groove 5a extending parallel to its axis. In each groove 5a, a guide pin 34 fixed to the housing 3 is received as shown in FIG. 5.

When the shafts 5 are pulled toward the proximate end of the chuck by the drawbar, they are moved along the above-mentioned three general lines toward the apex of the imaginary cone all at once. The pins 34 prevent the shafts 5 from rotating about their axes when moved axially. Thus, as the shafts 5 retract, the inner clamp surfaces of the jaws 6 gradually move radially inwardly toward each other until pressed against the outer circumferential surface of the workpiece W as shown in FIG. 4.

On the other hand, the abovementioned second type of chuck (known as a face-clamp chuck; not shown) has three round shafts that are arranged around and parallel to the central axis of the chuck and each carrying a jaw at the distal end thereof When the shafts are pulled toward the proximate end of the chuck by the drawbar, the jaws 6 are moved together with the shafts 5 toward the proximate end of the chuck and pressed against the end face (perpendicular to the central axis of the chuck) of the workpiece to clamp it.

With this type of chuck, each shaft is formed with a guide groove comprising a first portion extending parallel to the central axis of the shaft and a second portion connecting with the proximate end of the first portion and extending obliquely relative to the axis of the shaft toward the proximate end of the shaft. A guide pin fixed to the housing is received in the guide groove of each shaft.

When the shafts are fully extended, the guide pins are at the proximate end of the second portion of the guide grooves, and the jaws are positioned such that their clamping surfaces face away from the central axis of the chuck. In this state, a workpiece is set in the chuck. Then, the shafts are retracted by the drawbar, so that the guide pins move in the second portion of the grooves toward the first portion. Thus, the shafts turn around their own axes so that the clamping surfaces of the jaws all face the central axis of the chuck by the time the guide pins enter the first portion of the grooves. When the shafts are further retracted, the jaws engage the end face of the workpiece to clamp it.

The chuck shown in FIG. 4 has a centering function. But it cannot clamp such a workpiece W as shown in FIG. 1 at its shaft portion W2 with its large-diameter base portion W1 received inside the jaws if the radial length of the base portion W1 is greater than the diameter of the circle defined by the clamping surfaces of the jaws when the shafts are fully extended.

On the other hand, the face-clamp type chuck has no centering function. Thus, precise working is difficult with the face-clamp chuck.

An object of the invention is to provide a chuck having a centering function and capable of clamping a stepped workpiece at its thin portion even if its thick portion has a greater radial length than the maximum clamping diameter of the jaws.

SUMMARY OF THE INVENTION

According to the invention, there is provided a retractable chuck comprising a housing adapted to be fastened to a spindle of a lathe, a plurality of round shafts mounted in the housing so as to be rotatable about its central axis and having proximate ends near the lathe adapted to be coupled to a drawbar of the lathe, jaws each fastened to one of the shafts at a distal end thereof remote from the lathe, the shafts being arranged so as to be moved along equiangularly spaced general lines on an imaginary cone coaxial with the housing and tapering toward a proximate end of the chuck near the lathe, each of the shafts being formed with a guide groove having two ends each located at the same axial position as the respective ends of the guide grooves of the other shafts, and guide pins fixed to the housing and each received in one of the guide grooves, each of the grooves comprising a first portion extending parallel to the central axis of the respective shaft, and a second portion extending obliquely with respect to the central axis of the respective shafts from one end of the first portion near the lathe toward the proximate end of the chuck, the guide groove being arranged such that when any of the guide pins is in the first portion of the corresponding guide groove, the corresponding jaw faces the central axis of the chuck.

With this arrangement the workpiece is centered.

The second portions of different shafts may have different forms from each other in length and inclination angle with respect to the first portion.

This makes it possible to turn the shafts and thus jaws not simultaneously but with a time lag. With this arrangement., a longer space is defined between the jaws when the shafts are fully extended than in the arrangement in which the jaws are turned simultaneously in the same direction. Thus, it is possible to set a workpiece having a thick base portion. Also, the jaws will not interfere with each other even if the shaft portion of the workpiece is small in diameter. If all the jaws were turned simultaneously in the same direction, the jaws might interfere with each other if the shaft portion of the workpiece is small in diameter.

Thus it is possible to clamp a stepped workpiece at its small-diameter portion with its base portion received inside the jaws even if the base portion is relatively thick.

Other features and objects of the present invention will become apparent from the following description made with reference to the accompanying drawings, in which:

DETAILED DESCRIPTION OF THE PREFERRED EMBODIMENT

Figure 1:
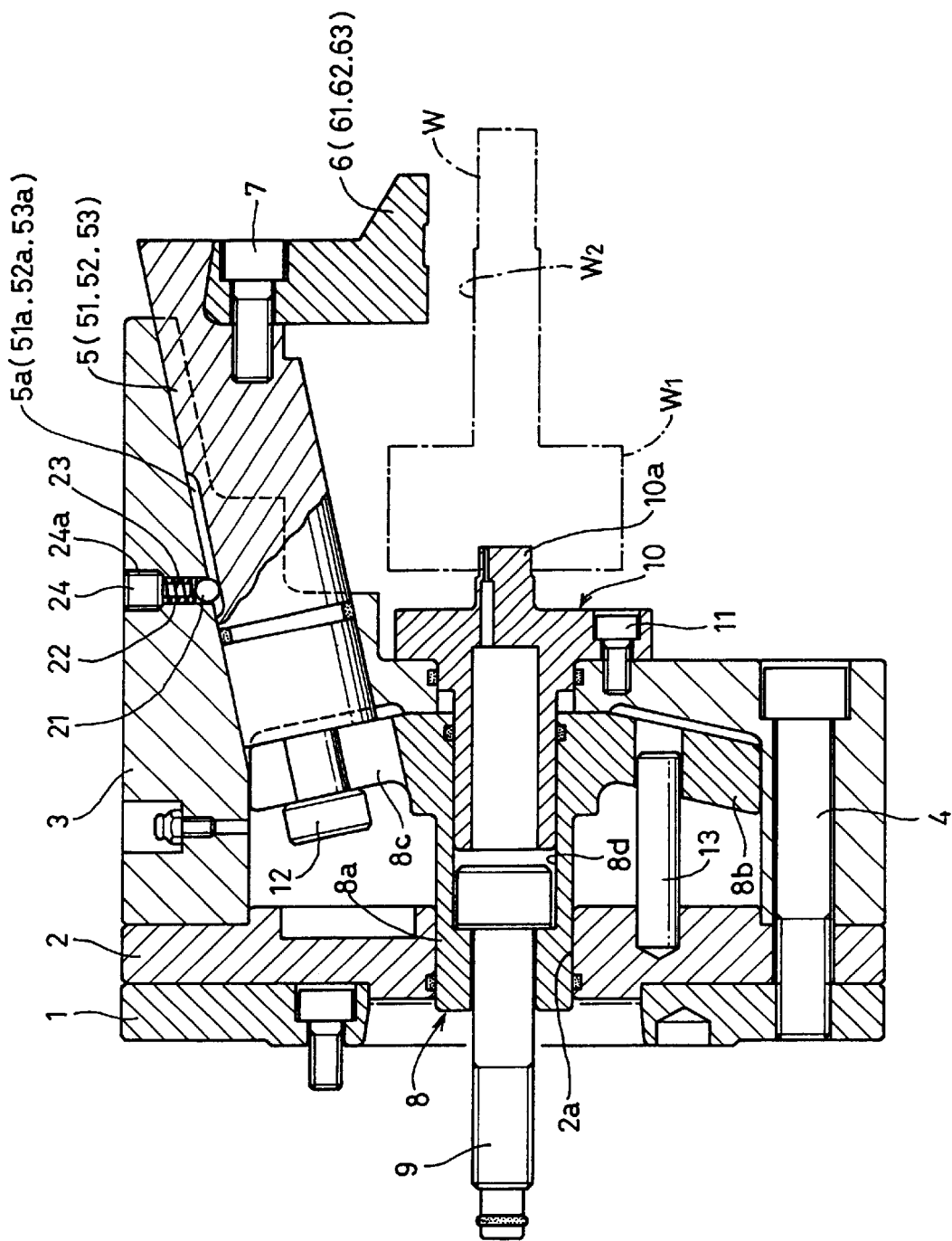
FIG. 1 is a sectional side view of a chuck embodying the invention in a non-clamping state.

The chuck of the embodiment includes an adaptor plate 1, a back plate 2 and a cylindrical housing 3 superposed one on another and fastened to the end face of a lathe (not shown) by bolts 4 so as to be coaxial with the lathe spindle.

Three round swing shafts 5 (individual shafts are hereinafter sometimes referred to by numerals 51, 52 and 53) are mounted in the housing 3. A jaw 6 (numerals 61, 62 and 63 are also sometimes. used) is fastened to a distal end (remote from the lathe) of each shaft 5 by a bolt 7. The respective swing shafts 5 are arranged so as to be movable along three equiangularly (120°) spaced general lines of an imaginary cone coaxial with the drawbar and tapering toward the proximate end of the chuck.

The back plate 2 is formed with a guide hole 2a coaxial with the spindle of the lathe. An actuator 8 has its body 8a received in the hole 2a.

The body 8a is formed with a through hole 8d having a shoulder. A drawbar bolt 9 is received in the hole 8d with its head abuttting the shoulder of the hole 8d and the other end protruding from the proximate end of the hole 8d and threaded into the drawbar, not shown. The distal end of the hole 8d is closed by a stopper 10 having a flange pressed against a recessed surface of the housing 3 and fixed thereto by bolts 11. A small-diameter protrusion 10a is formed on the distal end of the stopper 10 for supporting a workpiece W.

The flange 8b of the actuator 8 is formed with three equiangularly spaced, radially elongated holes 8c. Each shaft 5 has, at its proximate end, a bolt 12 inserted in one of the holes 8c with its head engaging the surface of the flange 8b near the lathe.

Pins 13 are inserted in the flange 8b of the actuator 8 and the back plate 2 to prevent the actuator 8 from turning relative to the lathe spindle.

Figure 2A:
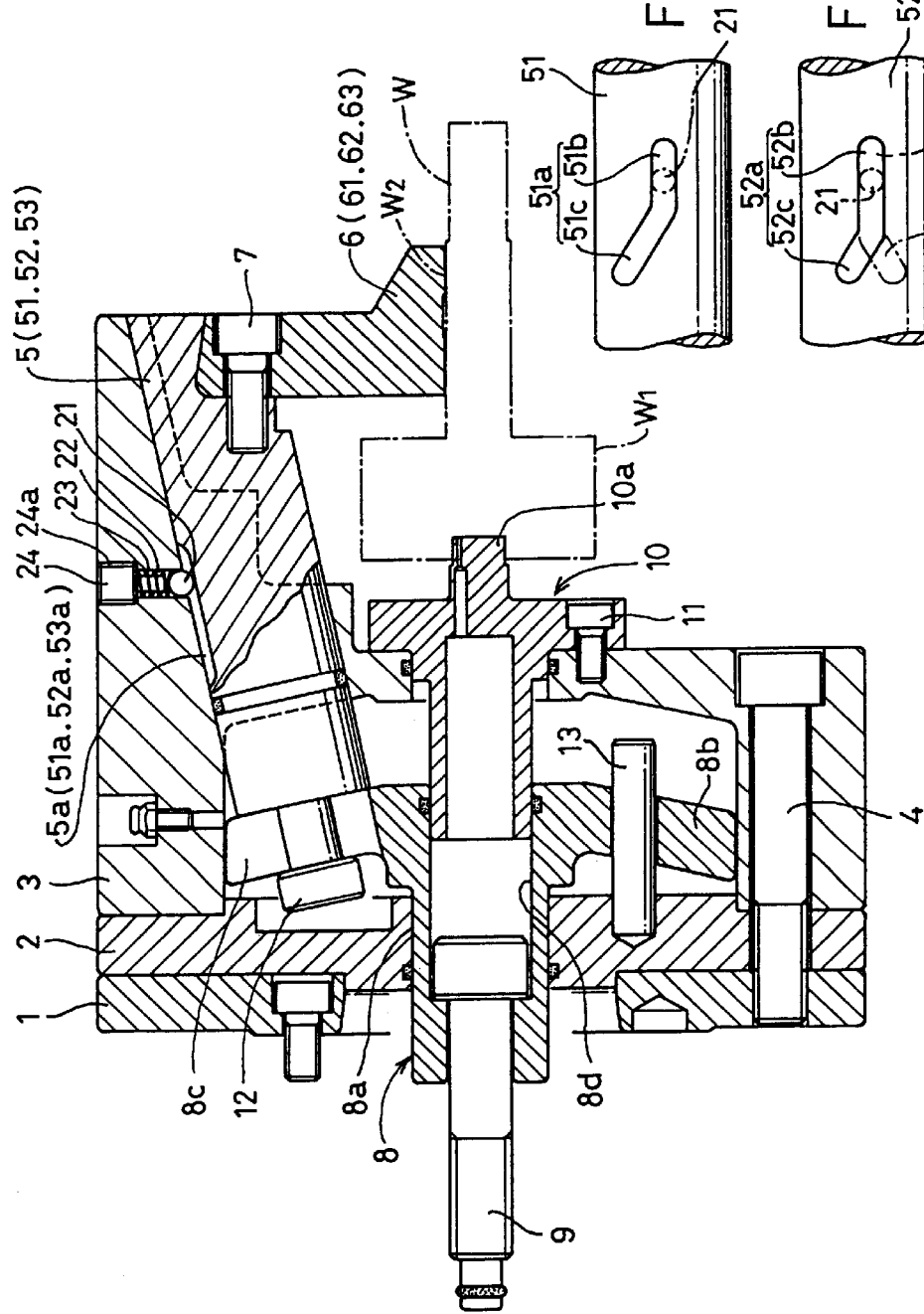
FIG. 2A is a similar view of the same in a clamping state.
Figure 2B:
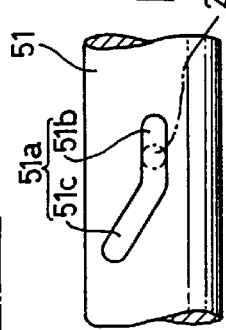
FIGS. 2B and 2C are side views of portions of the shafts where the guide grooves are formed.
Figure 2C:
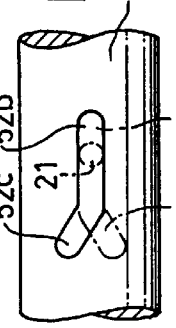

The swing shafts 5 are formed with guide grooves 5a. (The guide grooves formed in the respective shafts 51, 52 and 53 are hereinafter sometimes referred to by numerals 51a, 52a, 53a.) The distal and proximate ends of the respective grooves are at the same axial positions (FIGS. 2B, 2C).

Each groove 5a comprises a first portion 5b (51b, 52b, 53b) extending parallel to the axis of the swing shaft 5 and a second portion 5c (51c, 52c, 53c) extending obliquely relative to the axis of the shaft 5 from the proximate end of the first portion toward the proximate end of the shaft 5. As shown in FIGS. 2B and 2C, the first portion 51b of the groove of the shaft 51 is shorter than the first portions 52b and 53b of the grooves of the shafts 52, 53 and thus the second portion 51c of the groove shaft 51 is correspondingly longer than the second portions 52c and 53c of the grooves of the shafts 52, 53. The second portions 52c and 53c are of the same length and bent in opposite directions at the same angle (FIG. 2C).

A ball 21 has its lower half portion loosely received in each groove 5a and its upper half loosely received in a small-diameter portion of a radial hole 22. A stepped pin 24 having a spring 23 wound around its small-diameter portion is secured in the hole 22 with threads 24a on its large-diameter portion engaging with threads formed on the large-diameter portion of the hole 22. In this state, the spring 23 is compressed in the small-diameter portion of the hole 22. The ball 21 is thus biased radially inwardly by the spring 23. There is a clearance between the radially inner end of the pin 24 and the ball 21 as well as the clearance between the inner wall of the hole 22 and the ball. Due to this clearance and the fact that the ball is loosely received in the groove 5a and the hole 22, the ball can move relatively freely in any direction within a limited range.

Figure 4:
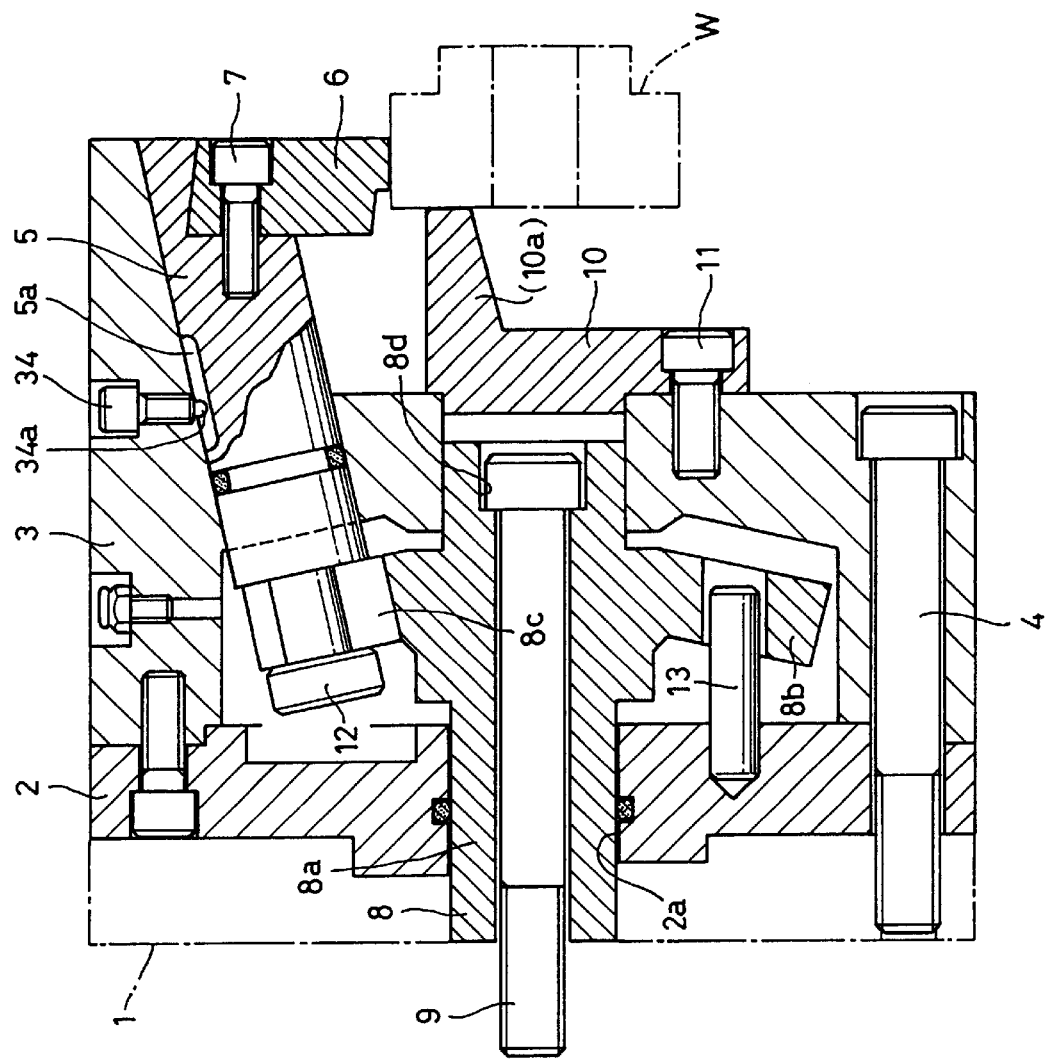
FIG. 4 is a sectional side view of a conventional chuck.
Figure 5:
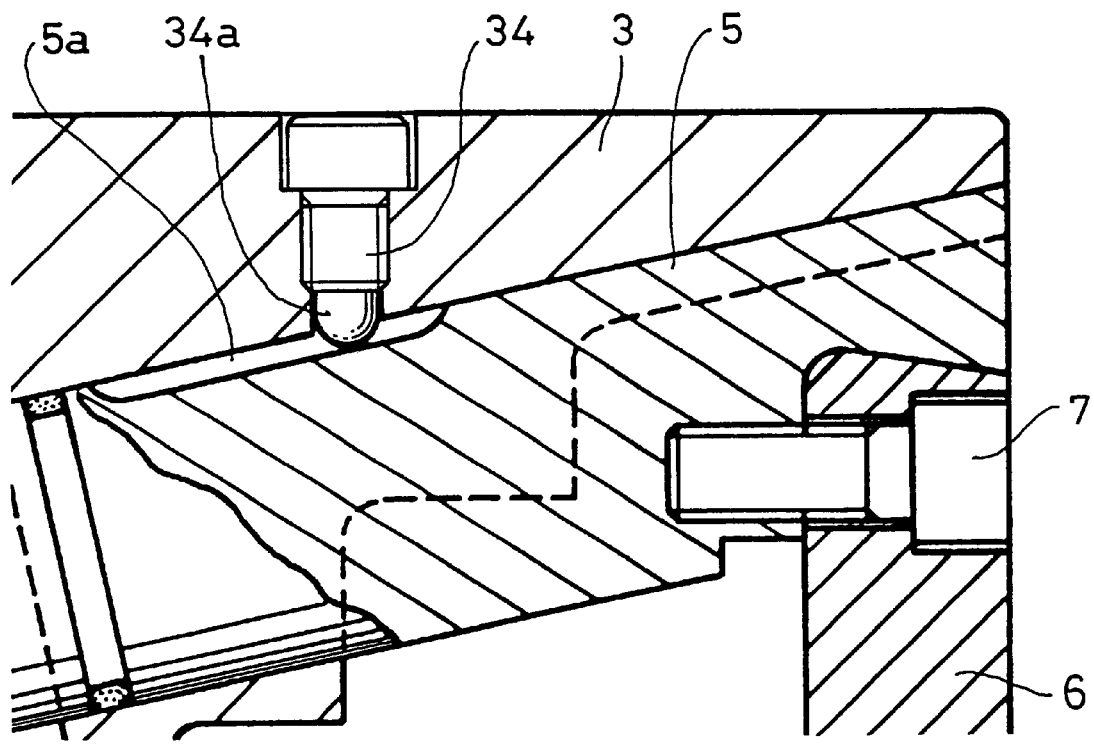
FIG. 5 is a partial enlarged view of FIG. 4.

This ball-and-spring guide arrangement is used instead of a conventional guide pin 34 shown in FIGS. 4 and 5. The guide pin 34 is usually formed by rounding the tip of a commercially available threaded bolt with a hexagonal wrench-engaging recess and is threaded into the radial hole so that the rounded tip is received in the groove 5a. In this arrangement, since the rounded tip portion 34a cannot move at all, a large force tends to act thereon. Thus, the rounded tip portion 34a as well as the shank of the pin tends to get worn, deformed or otherwise damaged, or broken in the worst case.

The ball-and-spring guide arrangement of the present invention is free of this problem because, as mentioned above, the ball 21 can move relatively freely in any direction within a limited range though it is enclosed in a space defined by the inner wall of the groove 5a, inner wall of the hole 22 and the lower end of the guide pin 24.

According to the invention, in order that the ball can roll smoothly in the groove 5a while minimizing wear, the groove has a semicircular cross-section instead of a conventional V-shaped section.

The holes 22 are formed at such positions that the jaws 6 face the central axis of the chuck when the balls 21 are in the first portions 5b of the grooves 5a.

Figure 3A:
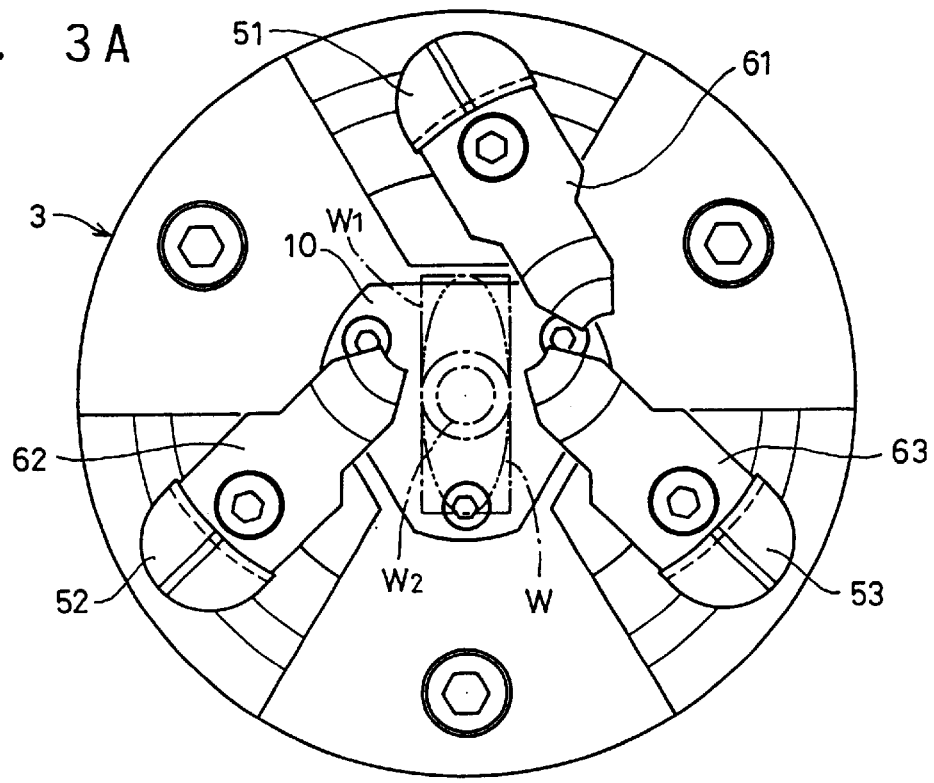
FIGS. 3A and 3B are plan views of FIGS. 1 and 2A, respectively.

Now the operation is described. FIGS. 1 and 3A show a state in which the workpiece W has been set in position in the housing 3 but has not yet been clamped. FIGS. 2A–2C and 3B show the clamped position.

In the state of FIGS. 1 and 3A, the jaws 6 all face away from the central axis of the chuck as shown in FIG. 3A, so that the workpiece W with the large-diameter base portion W1 can be set in the position of FIG. 1. When the drawbar is pulled in this state to pull the shafts 51, 52 and 53, the jaws 6 all begin to move toward the central axis of the chuck, and simultaneously turn together with the respective shafts 5 around an axis parallel to the. central axis of the. chuck.

Since the second portions 52c, 53c of the grooves of the shafts 52, 53 are shorter than the second portion 51c, the balls 21 in the grooves of the shafts 52 and 53 move into the first portions before the ball in the groove of the shaft 51 moves into its first portion. Thus, the jaws 62, 63 turn to face the central axis of the chuck before does the jaw 61. When the drawbar is further pulled, the jaws 62 and 63 simply move toward the central axis of the chuck without turning, while the jaw 61 keeps turning because the ball in the groove of the shaft 51 is still in its second portion. When the ball 21 in the groove of the shaft 51 enters its first portion, the jaw 61 also turns to face the central axis of the chuck without interfering with the other jaws 62 and 63.

When the drawbar is further pulled, all the jaws now simply move toward the central axis of the chuck without turning until coming into contact with the side surface of the shaft portion W2 of the workpiece before the balls 21 in the grooves reach the ends of the first portions 51b to 53b. After the jaws have come into contact with the shaft portion W2, the drawbar is further pulled to rigidly clamp the workpiece while centering it.

Figure 3B:
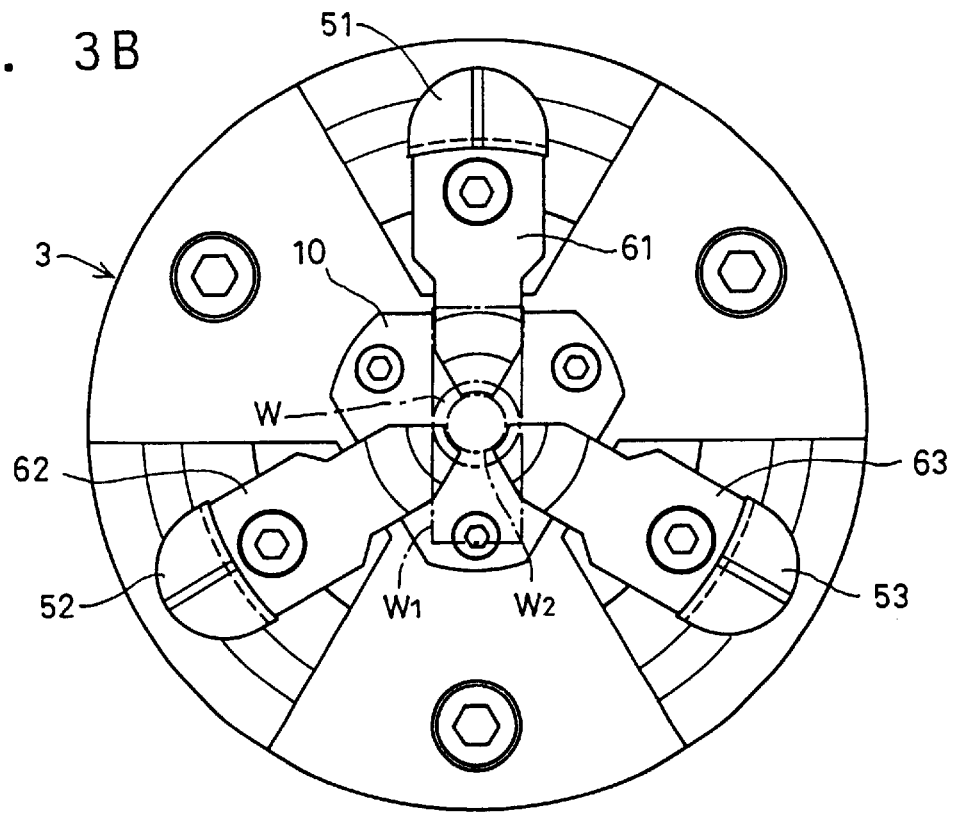

With the workpiece W clamped as shown in FIGS. 2 and 3B, the lathe spindle is turned to work the workpiece W. To release the workpiece, the drawbar is simply pushed. When the drawbar is pushed, the jaw 61 begins to turn toward the position of FIG. 3A before do the jaws 62 and 63, because the first portion 51b is shorter than the first portions 52b, 53b. Thus, they will not interfere with or collide against each other. If all the jaws began to turn at the same time toward the position of FIG. 3A, the jaws 61 and 63 would collide against each other, thus making it impossible to turn any further.

When moving from the state of FIG. 3B back to the state of FIG. 3A, the jaws are turned in different directions, that is, the jaw, 63 is turned clockwise, while the jaws 61 and 62 are turned counterclockwise. This is achieved due to the fact that the first portion 51b of the groove 51a of the shaft 51 is shorter than the first portions 52b, 53b of the grooves 52a and 53a of the shaft 52, 53. With this arrangement, in the state of FIG. 3A, a longer space is defined by the jaws than when the jaws are turned in the same direction. Thus, it is possible to set a workpiece having a large-diameter base portion W1.

What is claimed is:

1. A retractable chuck comprising a housing adapted to be fastened to a spindle of a lathe, a plurality of round shafts mounted in said housing so as to be rotatable about its central axis and having proximate ends arranged to be near the lathe and adapted to be coupled to a drawbar of the lathe, jaws each fastened to one of said shafts at a distal end thereof arranged to be remote from the lathe, said shafts being arranged so as to be moved along equiangularly spaced general lines on an imaginary cone coaxial with said housing and tapering toward a proximate end of the chuck arranged to be near the lathe, each of said shafts being formed with a guide groove having two ends each located at the same axial position as the respective ends of the guide grooves of the other shafts, radial holes respectively formed in said housing so as to oppose said guide grooves, balls respectively having lower half portions thereof loosely received in said guide grooves and upper half portions loosely received in said radial holes, guide pins respectively inserted in said radial holes with radially inner ends of said guide pins respectively spaced from said balls, and springs respectively mounted around said pins in compressed states, and springs respectively mounted around said pins in compressed states to bias said balls radially inwardly, each of said grooves comprising a first portion extending parallel to the central axis of said respective shaft, and a second portion extending obliquely with respect to the central axis of said respective shaft from one end of said first portion arranged to be near the lathe toward sad proximate end of the chuck, said guide grooves being arranged such that when any of said guide pins is in said first portion of the corresponding guide groove, the corresponding jaw faces the central axis of the chuck.

2. A retractable chuck comprising a housing adapted to be fastened to a spindle of a lathe, a plurality of round shafts mounted in said housing so as to be rotatable about its central axis and having proximate ends arranged to be near the lathe and adapted to be coupled to a drawbar of the lathe, jaws each fastened to one of said shafts at a distal end thereof arranged to be remote from the lathe, said shafts being arranged so as to be moved along equiangularly spaced general lines on an imaginary cone coaxial with said housing and tapering toward a proximate end of the chuck arranged to be near the lathe, each of said shafts being formed with a guide groove having two ends each located at the same axial position as the respective ends of the guide grooves of the other shafts, and guide pins fixed to said housing and each received in one of said guide grooves, each of said grooves comprising a first portion extending parallel to the central axis of said respective shaft, and a second portion extending obliquely with respect to the central axis of said respective shaft from one end of said first portion arranged to be near the lathe toward said proximate end of the chuck, said guide grooves being arranged such that when any of said guide pins is in said first portion of the corresponding guide groove, the corresponding jaw faces the central axis of the chuck, wherein said grooves formed in said shafts have arrangements of said first and second portions different from one another.

3. The chuck of claim 2 wherein said plurality of shafts consist of three shafts, wherein the second portion of the guide groove formed in one of said three shafts is longer than the second portions of the other two shafts, and wherein the second portions of said other two shafts are inclined relative to the first portion of said one shaft by the same angle but extend in opposite directions.

* * * * *